O. ALEXANDER.
METHOD OF MOVING BUILDINGS FROM ONE SITE TO ANOTHER.
APPLICATION FILED NOV. 1, 1920.
1,418,510.
Patented June 6, 1922.
5 SHEETS—SHEET 1.
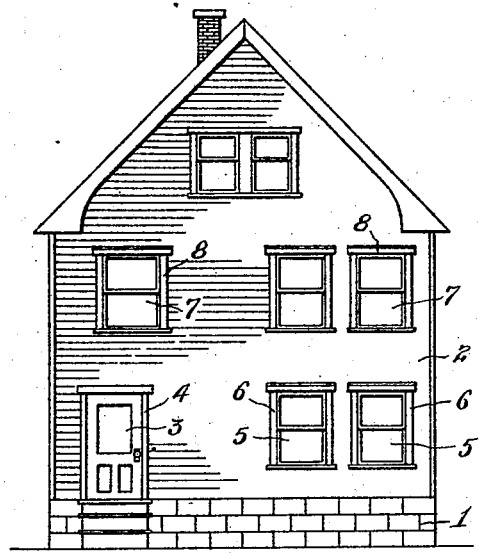
Fig. I.
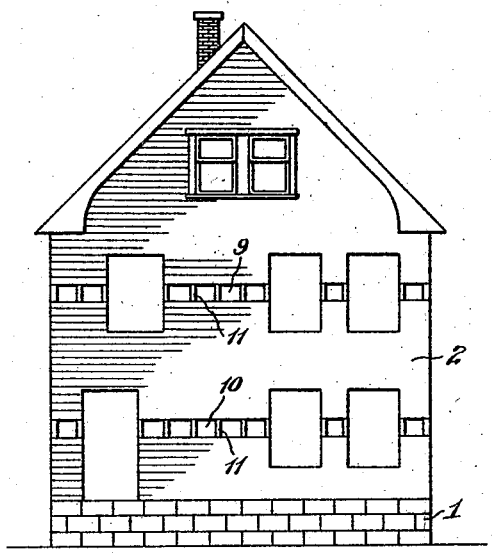
Fig. II.
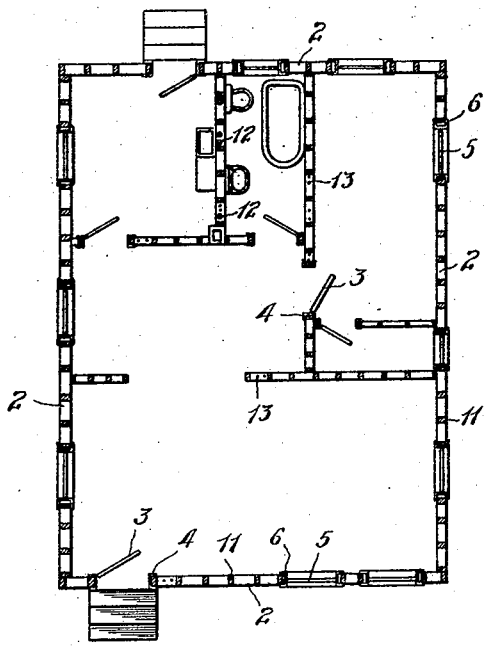
Fig. III.
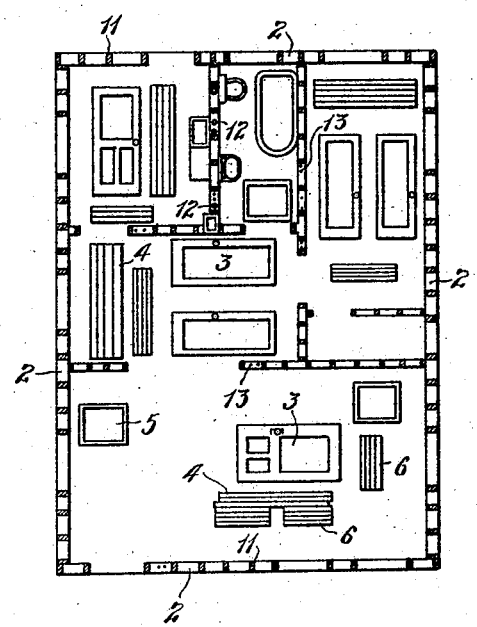
Fig. IV.
Inventor:
ORION ALEXANDER
By his atty.

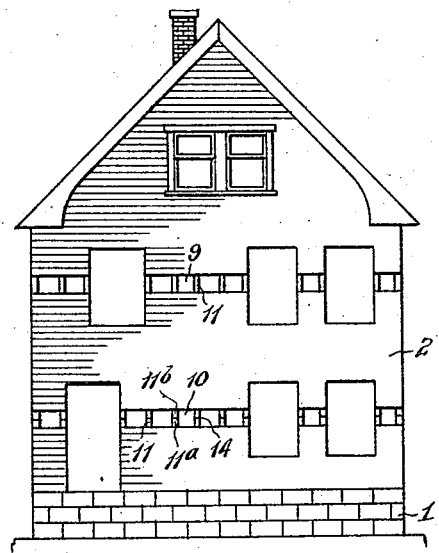
Fig. V.
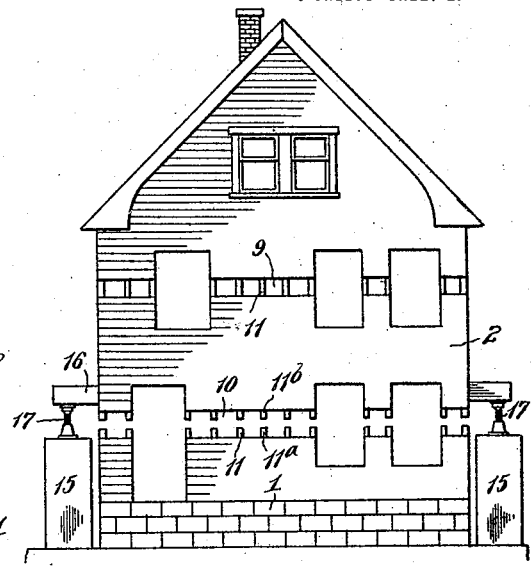
Fig. VI.
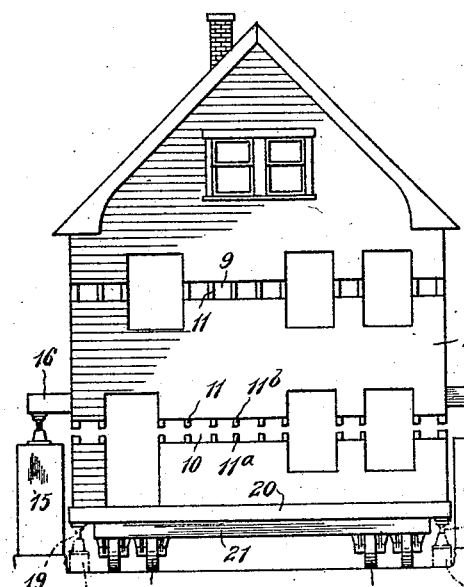
Fig. VII.
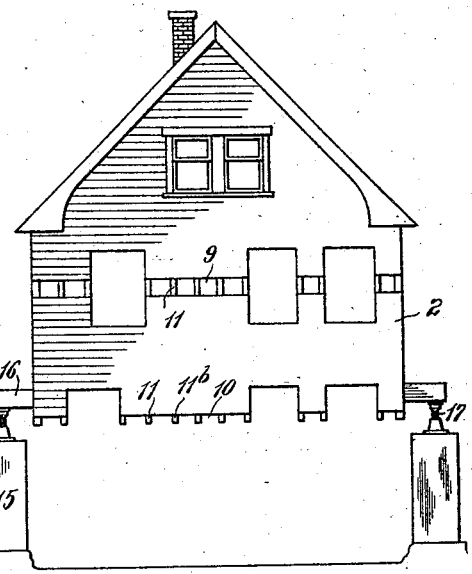
Fig. VIII.
Inventor:
ORION ALEXANDER

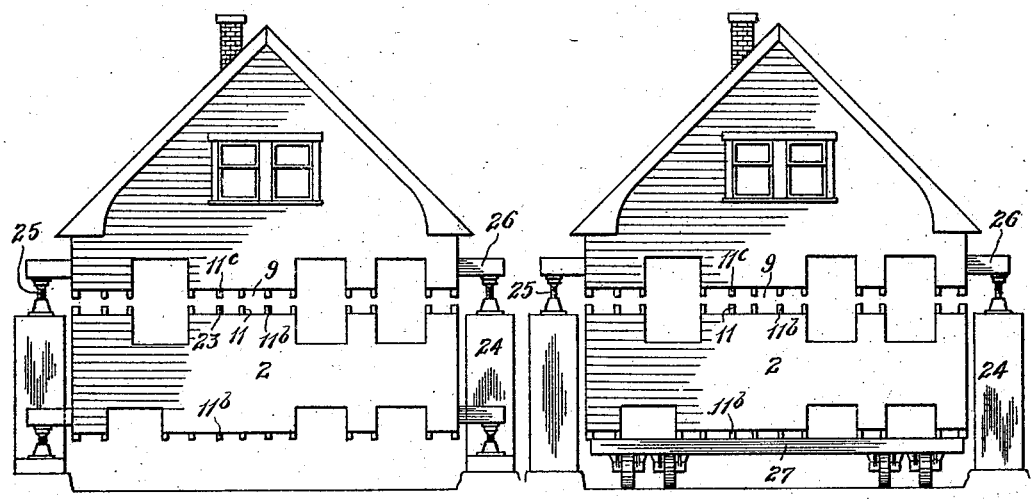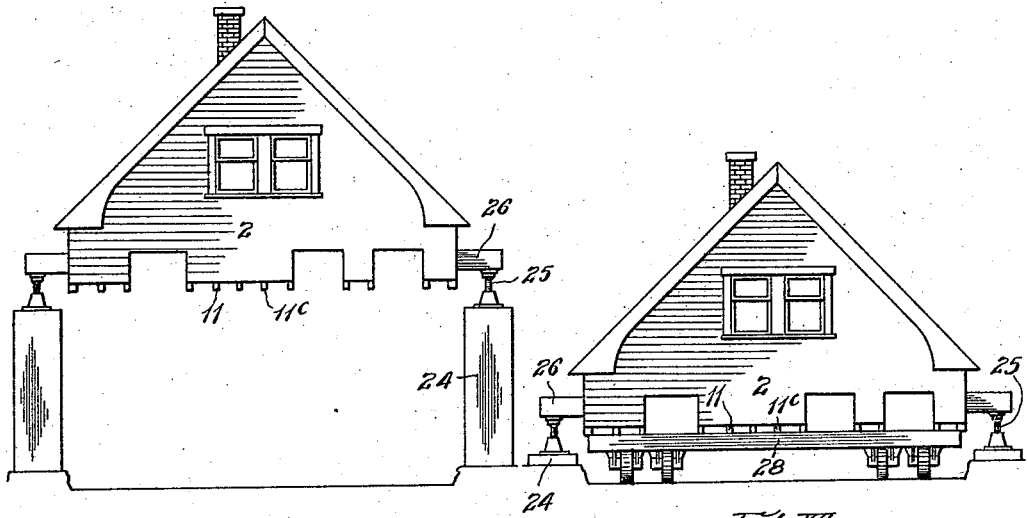

O. ALEXANDER.
METHOD OF MOVING BUILDINGS FROM ONE SITE TO ANOTHER.
APPLICATION FILED NOV. 1, 1920.
1,418,510.
Patented June 6, 1922.
5 SHEETS—SHEET 4.
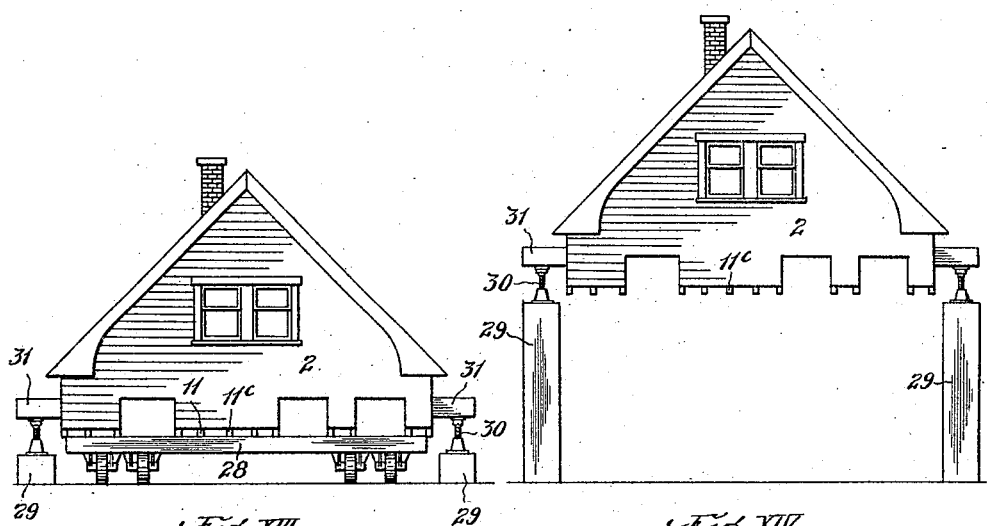
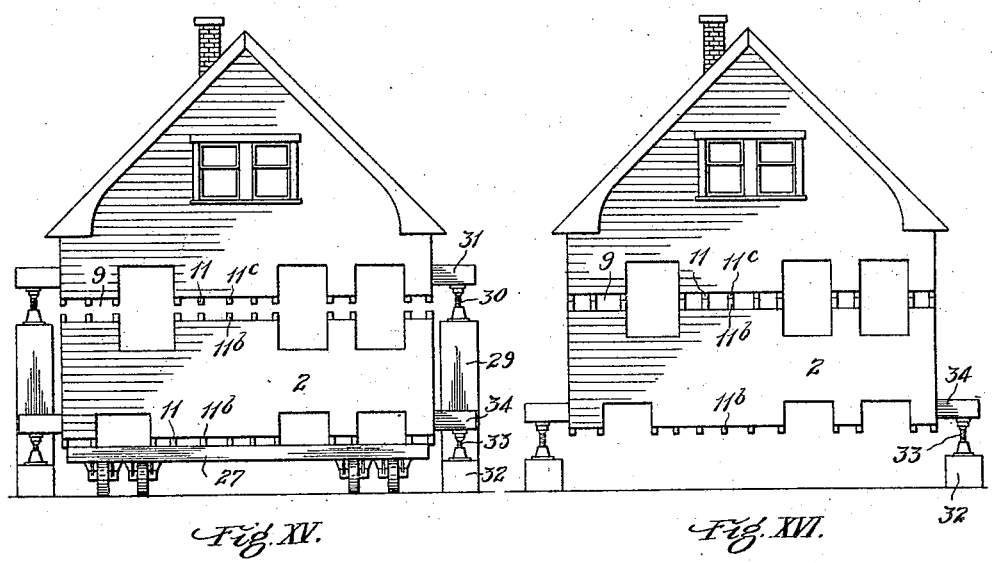
Inventor:
ORION ALEXANDER
By his atty.

O. ALEXANDER.
METHOD OF MOVING BUILDINGS FROM ONE SITE TO ANOTHER.
APPLICATION FILED NOV. 1, 1920.
1,418,510.
Patented June 6, 1922.
5 SHEETS—SHEET 5.
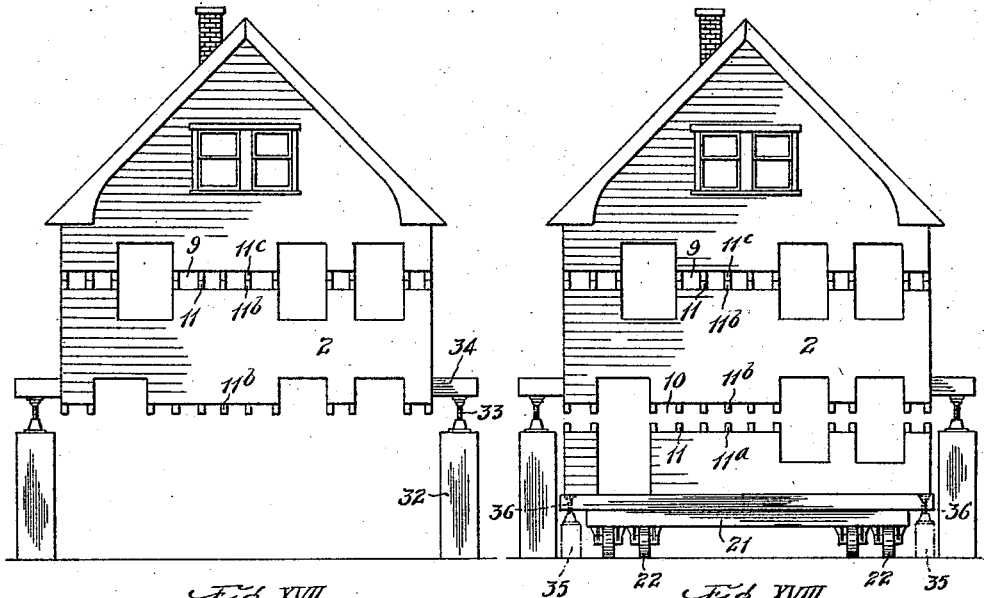
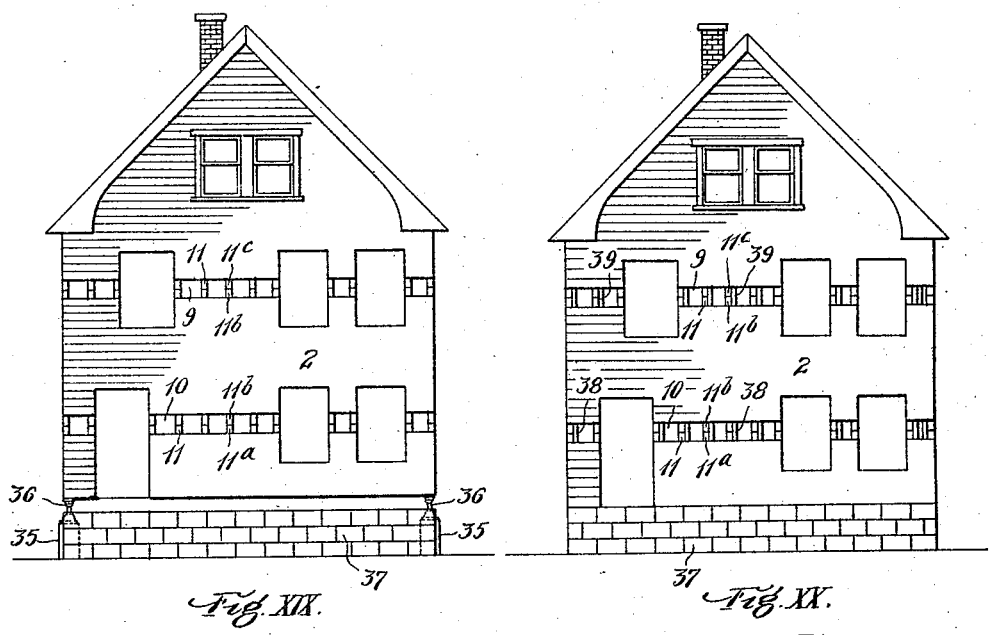
Inventor:
ORION ALEXANDER.
By his atty.

UNITED STATES PATENT OFFICE.

ORION ALEXANDER, OF CLEVELAND, OHIO, ASSIGNOR TO THE ALEXANDER CONSTRUCTION COMPANY, OF CLEVELAND, OHIO.

METHOD OF MOVING BUILDINGS FROM ONE SITE TO ANOTHER.

1,418,510.     Specification of Letters Patent.    Patented June 6, 1922.

Application filed November 1, 1920. Serial No. 421,010.

*To all whom it may concern:*

Be it known that I, ORION ALEXANDER, a citizen of the United States, residing at 2452 E. 93rd St., in the city of Cleveland, county of Cuyahoga, and State of Ohio, have invented a new and useful Improvement in Methods of Moving Buildings from One Site to Another, of which the following is a specification, the principle of the invention being herein explained and the best mode in which I have contemplated applying that principle, so as to distinguish it from other inventions.

My invention relates to the method of moving buildings from one site to another and more particularly to the method of separating superimposed parts of the building and then moving the parts according to a predetermined sequence of steps.

I propose to first remove all re-usable parts of the interior finish of the building to be moved, along the proposed line of substantially horizontal cut, also to remove along the same line any exterior finish, such as sidings or clapboards, next to remove window frames which are intersected by the proposed line or lines of cut, next to remove unreplaceable material along the proposed line of cut, for instance, plaster, then effecting the cutting of all walls and optionally the division of any chimney, next inserting a sub-structure preferably adjustable and collapsible, intended independently to support the part of the building above the line of cut, then to lift the upper section clear of the lower, then to load the lower section upon a suitable carriage, then to move such carriage and lower section away, then to lower the upper section and load it upon a carriage, thereafter to elevate the upper or roof section to a position over the new site sufficiently high to permit of the next lower section to be moved underneath, then withdrawing its supporting carriage, then moving the lower section to a position below the upper, then raising the lower section on another and independent support up to the upper section to lift the latter clear of its support and to enable withdrawal in turn of the carriage for the lower section, and finally lowering both sections upon a new foundation.

The outstanding advantage of my invention is that it will permit of moving sections of large buildings through congested zones where the moving of the building in its entirety would be either impossible or prohibitive in cost.

Adverting to the drawings:

Figure I is a front elevation of a house prior to preparation for moving the same.

Figure II is a front elevation with some of the weather strips removed where the house is to be cut and also showing the doors and window frames, which intersect the lines of cut, removed.

Figure III is a plan section of the house shown in Figure I which may be supposed to be of the second floor prior to removal of the doors and window frames and before the pipes and wires have been cut.

Figure IV is a plan section corresponding of Figure III showing the doors and window frames removed and laid in the various rooms and also showing the pipes and wires cut.

Figure V is a view corresponding to Figure I being a front elevation of the house showing a cut through the studding in a lower section thereof.

Figure VI shows a substructure under the upper part and the latter jacked up.

Figure VII shows a front elevation of the house with its upper part jacked up and its lower section supported upon a truck.

Figure VIII is a view corresponding to Figure VII after the lower part has been removed by means of the truck.

Figure IX is a view showing the remaining part of the house lowered and again cut along a substantially horizontal plane, the middle section being in a position to be deposited upon a truck.

Figure X illustrates progress with the top section jacked up and the middle section resting on a truck.

Figure XI is an elevation showing the top section jacked up while the middle section has been removed.

Figure XII shows the top or roofed section lowered and resting on a truck preparatory to removal.

Figure XIII shows the top section on the truck and disposed over the new building site together with supporting means in place there, adapted to jack such top section off of the truck.

Figure XIV shows the top section jacked up high enough to enable the middle section to be moved underneath it.

Figure XV shows the middle section supported upon a truck moved into proper position under the top section; there being also shown in place the required supporting means adapted to jack up the middle section to permit the truck to be withdrawn.

Figure XVI is another elevation showing the middle section jacked up and the top section resting upon it.

Figure XVII shows both the top and middle sections jacked up to the final height plus necessary clearance.

Figure XVIII shows the top and middle sections in the same position together with the lower section supported underneath upon a truck.

Figure XIX shows the three sections jacked up over a new foundation preparatory to being lowered thereon.

Figure XX shows the three sections of the house lowered onto the new foundation and splicing means added to the studding wherever the same was severed.

The building which I have selected for the drawing of my invention is a dwelling house including a foundation 1 walls 2 doors 3 door frames 4 first story windows 5 window frames 6, second story windows 7 and second story window frames 8. The wall 2 is to be considered as provided with boards and exterior weather strips which when removed along the two proposed lines of cut 9 and 10, indicated in Figure II will reveal the studs 11. It will be observed that the proposed lines of cut 9 and 10 are such as to intersect the door and window frame openings in both the first and second stories. In the view shown in Figure III pipes are designated by the numeral 12 and wires by the numeral 13, the doors and window frames being shown to be still in place. Obviously, the doors and window frames may be preserved intact and may therefore be dismounted and conveniently arranged upon the floor as shown in Figure IV. It may be casually mentioned also that the lines of cut are preferably established in such a place as not to cause interference with, for instance, bath room fixtures.

After the house has been thus prepared the first actual cut along the line 14 may be made and such cutting is to be presumed of all parts of the building which intersect the horizontal plane in which the line 14 lies. Thereafter the second and third stories of the house may be lifted after the manner in common practice by means of a substructure including cribbing supports 15 running timbers or beams 16 and interposed jacks 17. It is to be understood that the substructures and jacking means merely exemplify a feasible mode of separating two sections of the house. In substitution for the step shown performed in Figure VI the ground might be dug out below permitting a truck to come underneath. Next, a temporary substructure is provided for the first story consisting of supports 18 jacks 19 and beams 20 intended to sustain the lower section after the foundation 1 has been removed to enable a truck 21 having wheels 22 to be brought underneath and to sustain the weight of the lower section after the supports 18 are no longer required and the jacks 19 have lowered the beams 20 upon the truck. Passing mention is made that the order of sequence of some of the steps in my method may be varied, for example, the cut between the lower and middle sections might be deferred until the entire house had been lifted from its foundation and caused to be supported upon a truck before raising the middle and top sections off of the lower section. The lower section is then removed upon the truck thus further separating the portions 11$^a$ and 11$^b$ which comprised each of the first wall floor studs.

The operation to follow is the lowering in height of the cribbing 15 thus bringing down the two upper sections preparatory to insertion thereunder of another truck. Then a cut is made along a line 23 to separate the middle and top sections by severing each of the second floor wall studs into the two portions 11$^b$ and 11$^c$. The top section is then independently supported by means of cribbing 24, jacks 25 and running timbers 26 and then the top section lifted clear by means of the jacks 25 as shown in Figure IX. Thereafter a truck 27 is wheeled under the middle section preparatory to lowering the latter upon it as appears in Figure X. In Figure XI the truck 27 and middle section have disappeared, and in Figure XII the top section has been lowered upon a third truck 28 which in Figure XIII should be presumed to have been moved to a position over the new building site where a different supporting means including cribbing 29, jacks 30 and beams 31 are set in place ready to jack up the top section off of the truck 28 and to the elevated position shown in Figure XIV. Next the middle section is brought underneath upon the truck 27 and lifted clear of it by means of the cribbing 32, jacks 33 and timbers 34, such raising being of course accomplished so that all of the severed parts, including the stud portions 11$^b$ and 11$^c$ are again brought into accurate juxtaposition as may be seen in Figure XVI, where the superfluous cribbing 29, jacks 30 and timbers 31 appear removed. Thereafter both the middle and top sections are elevated together to a position shown in Figure XVII so as to afford the necessary clearance to enable the truck 21 which carries the lower section to be moved underneath. Means is now provided including supports 35 and jacks 36 for lifting the lower section off of the truck 21 and for bringing the ends 11ᵃ of the first floor studs into juxtaposition with the ends of the middle section studs 11ᵇ. Then the truck 21 is withdrawn and after the new foundation 37 has been built the three sections of the house are lowered upon it thus relieving the supports 35 and jacks 36 of further duty. The stud portions 11ᵃ and 11ᵇ are then united by splicing members 38 and similarly the stud sections 11ᵇ and 11ᵉ are united by splicing members 39 following which the interior pipes 12 and wires 13 may be reconnected in any approved manner and the doors and window frames again mounted in place. Finally, the interior finish is replaced exterior clapboards replaced plaster patching effected and other minor replacements accomplished.

Because the applicant shows a given series of steps, it is not to be construed that he intends to practice all of them in every instance. For example it might be desired to use only one horizontal section elsewhere, or some of the sections might have been damaged as by fire so that a mere separation of the useable and unuseable be proposed. It is quite within the bounds of practical possibility to move horizontal sections together in superimposed relation and then effect a superposed relation over a new site preparatory, for example, to inserting an additional new or substituted story.

I claim:—

1. The method of moving buildings from one site to another which consists in detaching interior units cutting the building along a line, holding the upper division in spaced relation to the lower, removing the lower division, resetting the latter elsewhere, bringing the two divisions into proper juxtaposition and then making reconnections.

2. The method of moving buildings from one site to another which consists in separating the walls and any other upright connections along a chosen substantially horizontal plane of division, jacking-up the upper division, removing both divisions to another site, supporting the upper division at the new site in an elevated position, moving the lower division underneath said upper division and then reconnecting all the parts of the building.

3. The method of moving buildings from one site to another which consists in first removing the interior finish bordering upon a proposed line of division, independently supporting the part of the building above such line, cutting the building along such line, removing the lower division to another site, removing the upper division to an elevated position over a foundation at the new site, setting the lower division upon said foundation and underneath said upper division, lowering the upper division down upon the lower and then reconnecting and finishing the building.

4. The method of moving buildings which consists in cutting the building along a substantially horizontal plane, separately moving the two sections to a new location and then reassembling them there.

5. The method of moving buildings which consists in cutting sidewise through the building to completely sever it into upper and lower sections, removing the lower and upper sections in the order stated, and repositioning the sections in the reverse order on the new site.

6. The method of moving buildings which consists in cutting the building to completely sever it into upper and lower sections, independently supporting the upper section, withdrawing the lower section removing the upper section to an elevated position over the new site, there inserting the lower section underneath and then bringing the sections together again.

7. The method of moving buildings which consists in cutting a building into superimposed sections, effecting a superposed relationship therebetween, successively moving the sections to a new location, and there reestablishing their original relationship.

8. The method of moving buildings which consists in detaching portions of the building along a proposed plane of cut, cutting all the walls and other parts of the building at substantially their points of intersection with said plane, separating the parts of the building on opposite sides of said plane of cut, removing the sections to another site and resetting the upper part upon the lower at said site.

9. The method of moving buildings from one site to another which consists in cutting the building along a predetermined line, removing the lower division, removing the upper division to an elevated position over the new site, moving the lower division underneath said upper division, raising the lower division up against the upper and then lowering both together upon said site.

10. The method of moving buildings from one site to another which consists in cutting the building along a substantially horizontal line, holding one division in spaced relation above the other, removing both divisions, bringing the divisions into proper juxtaposition elsewhere and then making reconnections.

11. The method of moving buildings which consists in cutting a building into superimposed sections, moving the sections to a new location, reestablishing their original relationship and then splicing severed portions of said sections together.

12. The herein described method comprising cutting a family dwelling into superimposed sections, and moving one to a new location.

13. The herein described method comprising cutting a building adapted for habitation into superimposed sections, holding them apart, removing one, and then emplacing one of said sections on another site.

14. The herein described method which consists in cutting a house into superimposed sections, supporting the upper in a position spaced above the lower, removing first one and then the other section to a different site, and then reconnecting said sections there in superimposed relation.

15. The herein described method which consists in severing a building into a plurality of sections by a cut including a substantially horizontal line, separately moving one of the sections to a new location and then resetting it there.

16. The method of moving buildings from one site to another which consists in cutting the building along a predetermined line, removing the sections thus formed to another site, causing the upper section to assume an elevated position over the new site, then moving the lower section underneath said upper section, and then emplacing both sections.

17. The method of moving buildings from one site to another which consists in cutting the building along a substantially horizontal line to form upper and lower sections, erecting a foundation on another site, and then bringing the sections into proper juxtaposition upon said foundation.

Signed by me this 30th day of September, 1920.

ORION ALEXANDER.